US010935434B2

(12) United States Patent
Yoshihara et al.

(10) Patent No.: US 10,935,434 B2
(45) Date of Patent: Mar. 2, 2021

(54) TEMPERATURE SENSOR

(71) Applicant: SHIBAURA ELECTRONICS CO., LTD., Saitama (JP)

(72) Inventors: Takamasa Yoshihara, Saitama (JP); Michiru Takemura, Semboku (JP); Masanori Kirihara, Semboku (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 315 days.

(21) Appl. No.: 15/769,660

(22) PCT Filed: Mar. 16, 2017

(86) PCT No.: PCT/JP2017/010609
§ 371 (c)(1),
(2) Date: Apr. 19, 2018

(87) PCT Pub. No.: WO2018/167903
PCT Pub. Date: Sep. 20, 2018

(65) Prior Publication Data
US 2019/0265108 A1 Aug. 29, 2019

(51) Int. Cl.
*G01K 1/14* (2021.01)
*H02K 11/25* (2016.01)
*G01K 7/22* (2006.01)

(52) U.S. Cl.
CPC .............. *G01K 1/14* (2013.01); *H02K 11/25* (2016.01); *G01K 7/22* (2013.01)

(58) Field of Classification Search
CPC .......... G01K 13/08; G01K 13/00; G01K 7/00; G01K 1/14; G01K 2205/00; G01K 7/36;
(Continued)

(56) References Cited

U.S. PATENT DOCUMENTS 3,321,635 A * 5/1967 Jacobs ................... H01H 43/32
250/575
3,815,074 A * 6/1974 Nagata ................. H01C 1/1413
338/22 R
(Continued)

FOREIGN PATENT DOCUMENTS

CN 206114130 U * 4/2017
DE 004211786 A1 * 10/1993
(Continued)

OTHER PUBLICATIONS

Extended European Search Report for Application No. 17859378, dated Nov. 29, 2018.
(Continued)

*Primary Examiner* — Gail Kaplan Verbitsky
(74) *Attorney, Agent, or Firm* — Pearne & Gordon LLP

(57) ABSTRACT

A temperature sensor 10 according to the present invention includes a coil element (10) connected to a coil of an electric apparatus, an element main body (51) that includes a thermosensitive body (52) detecting heat of the coil element (10) and paired electric wires (55 and 56) connected to the thermosensitive body (52), and a housing (25) that includes an electric insulating resin material and is configured to house the coil element (10) and the element main body (51). The housing (25) according to the present invention includes, at a position corresponding to the thermosensitive body (52), a view window (76) allowing for visual confirmation of the thermosensitive body (52) from outside.

10 Claims, 5 Drawing Sheets

(58) Field of Classification Search
CPC ........ G01K 1/08; G01K 1/16; G01K 2217/00;
H02K 1/12; H02K 1/2786; H02K
15/0435; H02K 1/14; H02K 9/24; H02K
11/25; H02K 9/19
See application file for complete search history.

(56) References Cited

U.S. PATENT DOCUMENTS

| | | | | |
|---|---|---|---|---|
| 4,717,787 | A * | 1/1988 | Freppon | G01K 1/08 |
| | | | | 136/226 |
| 5,906,584 | A * | 5/1999 | Pavoni | G01K 1/026 |
| | | | | 374/E1.005 |
| 6,025,556 | A * | 2/2000 | Yoshimura | H01C 1/034 |
| | | | | 174/524 |
| 6,086,249 | A * | 7/2000 | Urich | G01K 7/42 |
| | | | | 374/152 |
| 6,153,954 | A * | 11/2000 | Uchida | H02K 11/25 |
| | | | | 310/68 C |
| 8,454,228 | B2 * | 6/2013 | Skinner | G01K 15/007 |
| | | | | 374/1 |
| 10,371,739 | B2 * | 8/2019 | Voisine | G01N 25/72 |
| 10,436,648 | B2 * | 10/2019 | Yoshihara | H02K 11/25 |
| 10,742,093 | B2 * | 8/2020 | Yoshihara | H02K 11/25 |
| 2006/0208848 | A1 * | 9/2006 | Kawamoto | H01C 1/1413 |
| | | | | 338/22 R |
| 2007/0019706 | A1 * | 1/2007 | Hudson | G01K 1/08 |
| | | | | 374/152 |
| 2007/0171958 | A1 * | 7/2007 | Hoang | G01J 5/041 |
| | | | | 374/161 |
| 2012/0039355 | A1 * | 2/2012 | Wolosuk | G01K 11/12 |
| | | | | 374/155 |
| 2013/0106251 | A1 * | 5/2013 | Kaneshige | G01K 13/00 |
| | | | | 310/68 B |
| 2014/0204973 | A1 * | 7/2014 | Kinoshita | G01K 7/16 |
| | | | | 374/152 |
| 2015/0078418 | A1 * | 3/2015 | Suzuki | G01K 1/16 |
| | | | | 374/152 |
| 2015/0155760 | A1 * | 6/2015 | Bessho | H02K 3/522 |
| | | | | 310/68 C |
| 2017/0370781 | A1 | 12/2017 | Yoshihara | |
| 2018/0156669 | A1 * | 6/2018 | Koyama | G01K 1/14 |
| 2018/0193498 | A1 * | 7/2018 | Fritchie | A61L 2/04 |
| 2019/0265108 | A1 * | 8/2019 | Yoshihara | G01K 1/14 |
| 2019/0267871 | A1 * | 8/2019 | Yoshihara | H02K 11/25 |
| 2020/0012120 | A1 * | 1/2020 | Nam | G02B 27/1086 |
| 2020/0144896 | A1 * | 5/2020 | Tounosu | H02K 1/165 |
| 2020/0182708 | A1 * | 6/2020 | Yoshihara | G01K 7/00 |

FOREIGN PATENT DOCUMENTS

| | | | |
|---|---|---|---|
| FR | 3037738 | A1 | 12/2016 |
| JP | 405208423 | A * | 8/1993 |
| JP | H10229663 | A | 8/1998 |
| JP | 2011-254628 | A | 12/2011 |
| JP | 2017026521 | A | 2/2017 |
| WO | 2016-135776 | A1 | 1/2016 |
| WO | 2016/190198 | A1 | 12/2016 |

OTHER PUBLICATIONS

International Search Report for PCT/JP2017/010609 dated Jun. 13, 2017.

English machine translation of JP2017026521A, which was cited in an IDS filed Apr. 19, 2018.

* cited by examiner

TEMPERATURE SENSOR

This is a National Stage application of PCT international application PCT/JP2017/010609, filed on Mar. 16, 2017, which is incorporated herein by reference in its entirety.

TECHNICAL FIELD

The present invention relates to a temperature sensor suitable for detecting, for example, temperature of a coil of a stator in a rotating machine.

BACKGROUND ART

Temperature of a stator coil provided in a stator of a rotating machine such as an electric motor is increased when a current flows through the stator coil. To avoid excessive temperature increase of the stator coil to stably operate the rotating machine, the temperature of the stator coil is detected with use of a temperature sensor.

Patent Literature 1 provides a temperature sensor that, under the assumption that a temperature detection element is brought into contact with the coil, makes it possible to prevent positional displacement of the temperature detection element while suppressing stress applied to the temperature detection element. The temperature sensor includes a first holder fixed to a coil element and including a housing chamber that houses a thermosensitive body of the temperature detection element, and a second holder fixed to the coil element to prevent positional displacement relative to the first holder and holding a lead wire of the temperature detection element. A part of the thermosensitive body exposed from the housing chamber comes into contact with a surface of the coil element.

Patent Literature 1 covers and hides the thermosensitive body, the first holder and the second holder, with a resin mold.

CITATION LIST

Patent Literature

Patent Literature 1: JP 2017-26521 A

SUMMARY OF INVENTION

Technical Problem

When the resin molding is performed as disclosed in Patent Literature 1, resin pressure is applied to the thermosensitive body. Therefore, it is desirable to confirm soundness of the thermosensitive body for confirmation of breakage of the thermosensitive body after resin molding is performed. The soundness of the thermosensitive body, however, is not confirmed visually from outside because the resin mold is colored. For example, the soundness of the thermosensitive body is confirmable with use of a radio-parency apparatus but it is not realistic in consideration of a manufacturing line of the temperature sensor.

Accordingly, an object of the present invention is to provide a temperature sensor that allows for visual confirmation of soundness of a thermosensitive body from outside.

Solution to Problem

A temperature sensor according to the present invention includes a coil element serving as a part of a coil of an electric apparatus, an element main body that includes a thermosensitive body detecting heat of the coil element, and paired electric wires connected to the thermosensitive body, and a housing that includes an electric insulating resin material, and is configured to house and hold the coil element and the element main body.

The housing according to the present invention includes, at a position corresponding to the thermosensitive body, a view window allowing for visual confirmation of the thermosensitive body from outside.

The housing according to the present invention may include a first housing and a second housing both configuring the housing, and the view window may be provided on one or both of the first housing and the second housing.

In the present invention, the second housing may include a resin molded body with respect to the first housing, and the view window is preferably provided in the second housing.

The first housing in the present invention preferably includes electric wire holding holes into which the paired electric wires are inserted, and the paired electric wires are preferably drawn to the outside through the electric wire holding holes.

The temperature sensor according to the present invention preferably further includes a covering body that includes a transparent resin and closely covers the entire thermosensitive body and a part of the electric wires, and the view window is preferably provided at a position corresponding to the thermosensitive body covered with the covering body.

The covering body according to the present invention preferably comes into surface contact with the coil element.

In the temperature sensor according to the present invention, the covering body preferably includes a resin material having elasticity higher than elasticity of the resin material configuring the housing, and the housing preferably includes the resin material having rigidity higher than rigidity of the resin configuring the covering body.

The covering body according to the present invention preferably includes a fluorine resin.

Advantageous Effects of Invention

According to the temperature sensor of the present invention, the view window is provided at the position corresponding to the thermosensitive body. This allows for visual confirmation of soundness of the thermosensitive body from the outside even after the element main body is covered with the housing. Accordingly, the temperature sensor allows for detection and elimination of a defect occurred on the thermosensitive body after the housing is formed.

DESCRIPTION OF EMBODIMENT

An embodiment of the present invention is described below with reference to accompanying drawings.

Figure 1:
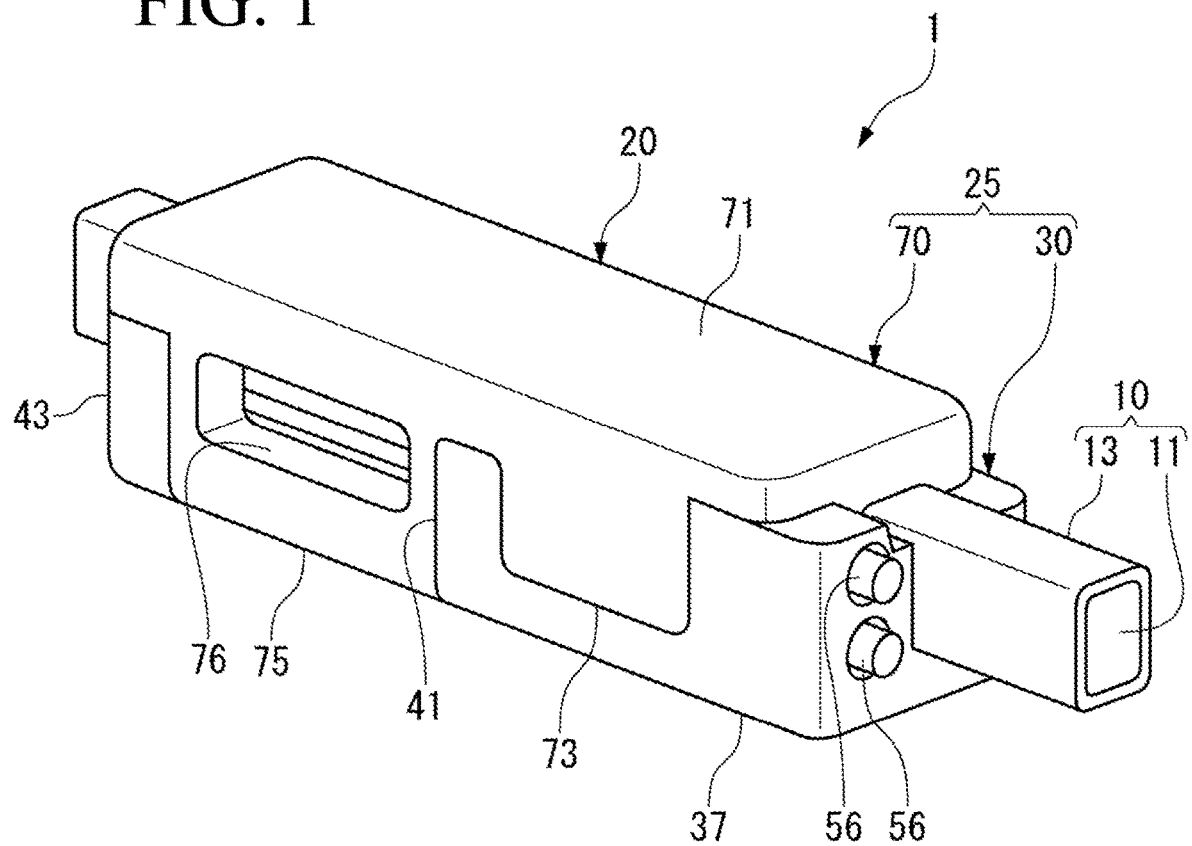
FIG. 1 is a perspective view illustrating a temperature sensor according to an embodiment of the present invention.
Figure 2A:
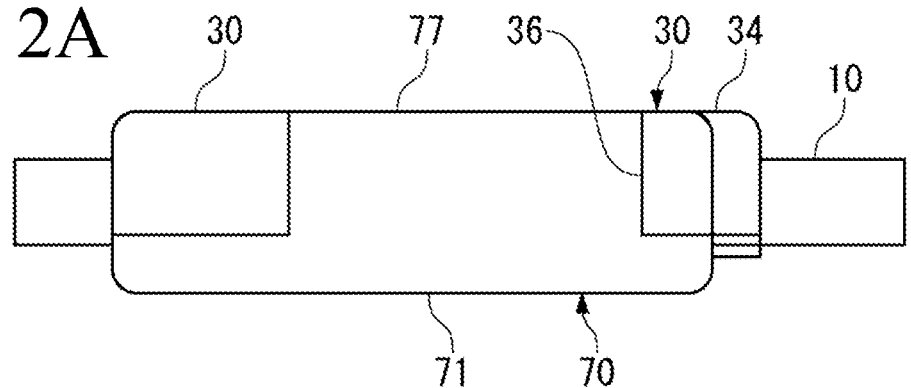
FIGS. 2A to 2D each illustrate the temperature sensor of FIG. 1, FIG. 2A being a rear view, FIG. 2B being a plan view, FIG. 2C being a front view, and FIG. 2D being a bottom view.
Figure 2B:
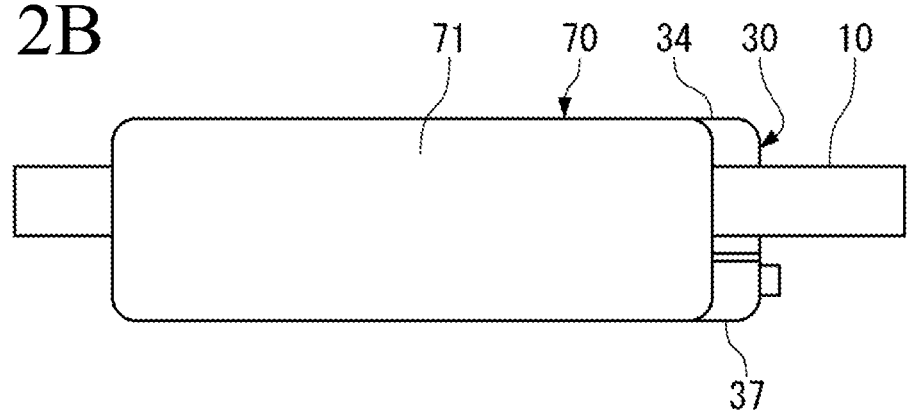
Figure 2C:
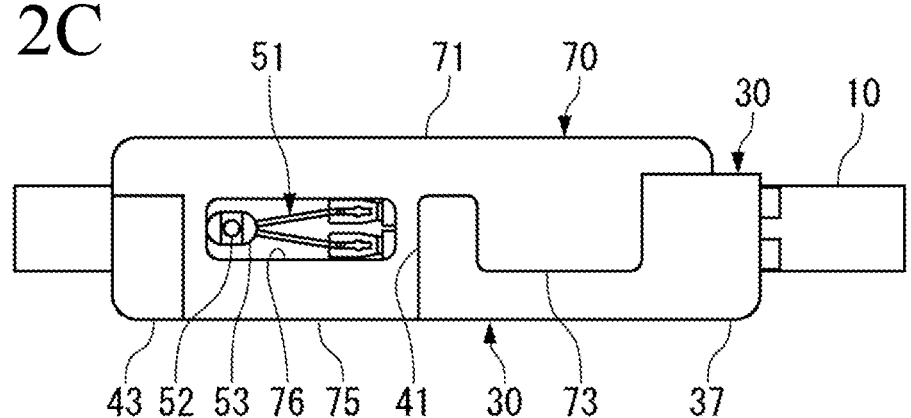
Figure 2D:
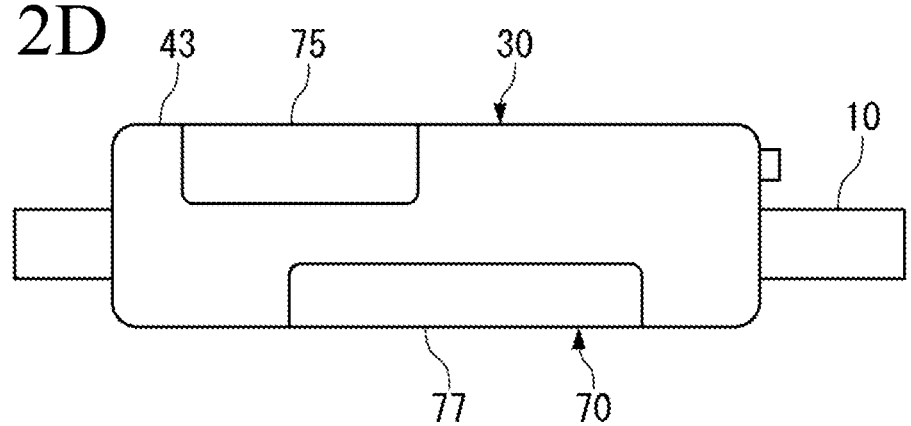

As illustrated in FIG. 1 and FIG. 2, a temperature sensor 1 according to the present embodiment includes a coil element 10 and a sensor assembly 20 to be fixed to the coil element 10. A thermosensitive body 52 included in the sensor assembly 20 can detect temperature of the coil element 10.

In the temperature sensor 1, the coil element 10 is electrically connected to a coil configuring a stator of a rotating machine not illustrated, to configure a part of the coil, and the sensor assembly 20 detects the temperature of the coil element 10 to detect temperature of the coil of the rotating machine.

The temperature sensor 1 includes a view window 76 at a part of the sensor assembly 20, and allows for visual confirmation of the thermosensitive body 52 from outside through the view window 76.

In the following, a configuration of the temperature sensor 1 is sequentially described, and the effects of the temperature sensor 1 are thereafter described.

[Coil Element 10]

The coil element 10 configures, together with the sensor assembly 20, the temperature sensor 1.

As illustrated in FIG. 1 and FIG. 2, the coil element 10 includes a straight rectangular wire that includes a conductor 11 and an electrically insulating covering 13 covering a surface of the conductor 11.

The coil element 10 includes a detection surface 12 as a flat surface, and the detection surface 12 comes into surface contact with a detection surface 65 of a covering body 60 inside a housing 25.

In the coil element 10, both ends of the conductor 11 are electrically connected to the coil that configures the stator of the rotating machine as an electric apparatus, thereby serving as a part of a stator coil.

The coil element 10 is housed in and held by the housing 25 except for the both ends.

[Sensor Assembly 20]

Figure 3A:
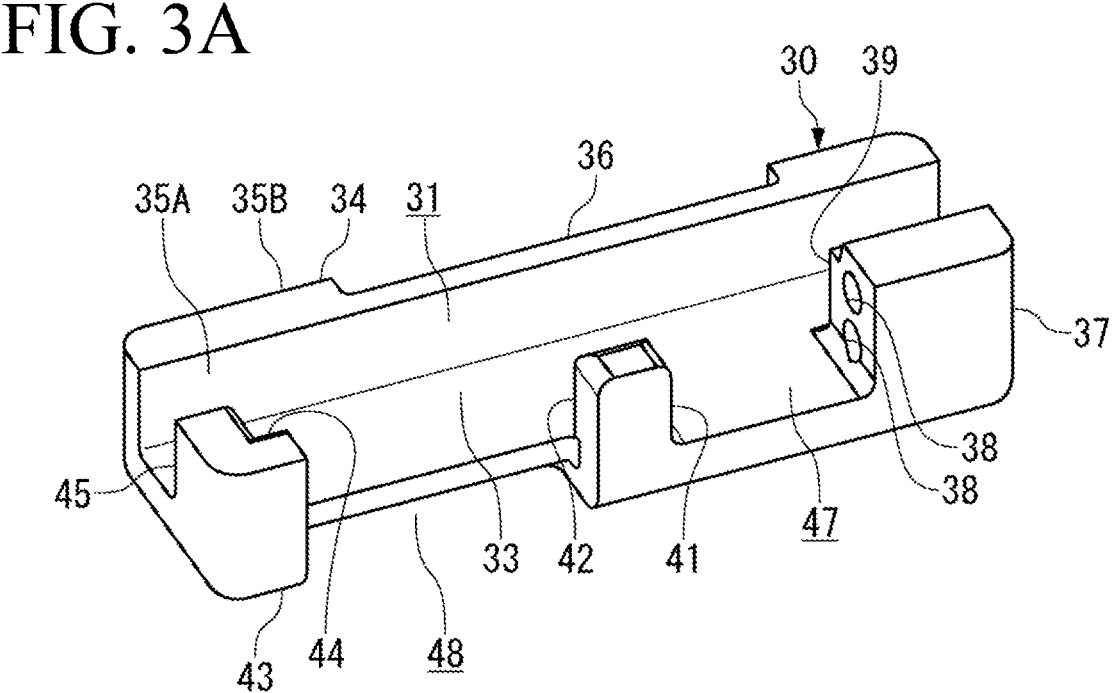
FIGS. 3A and 3B are perspective views illustrating a part of a procedure of manufacturing the temperature sensor of FIG. 1, FIG. 3A illustrating a first housing only, and FIG. 3B illustrating a state where a sensor intermediate body is disposed in the first housing.
Figure 3B:
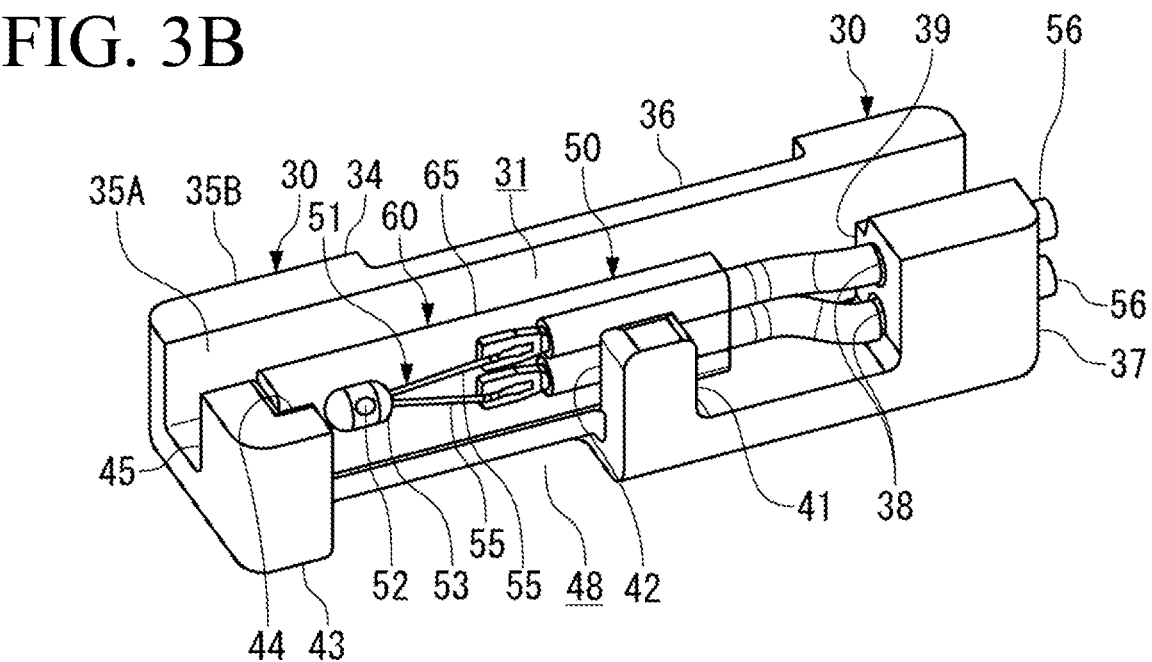
Figure 3B:

As illustrated in FIG. 1 to FIG. 3, the sensor assembly 20 includes the housing 25 and a sensor intermediate body 50 that is housed in the housing 25. The housing 25 includes a first housing 30 and a second housing 70, and covers and hides the sensor intermediate body 50. The second housing 70 includes a resin molded body that is previously formed through injection molding with respect to the first housing 30 housing the coil element 10 and the sensor intermediate body 50.

In the sensor assembly 20, when the coil element 10 is fixed to a predetermined position, the thermosensitive body 52 is positioned at a predetermined position of the coil element 10.

[First Housing 30]

As illustrated in FIG. 2 and FIG. 3, the first housing 30 includes a holding groove 31 holding the coil element 10 and the sensor intermediate body 50. The holding groove 31 penetrates through the first housing 30 in a longitudinal direction L. The first housing 30 is integrally molded through injection molding of an electrically insulating resin material. As the resin material, for example, polyphenylene sulfide (PPS) resin and polyamide (PA) resin may be used. The second housing 70 is made from the same resin material. The resin material configuring the first housing 30 and the second housing 70 has rigidity higher than rigidity of a fluorine resin configuring the covering body 60. Accordingly, the sensor assembly 20 is firmly fixed to the coil element 10.

The holding groove 31 is provided in a space surrounded by a bottom floor 33, a side wall 34, a first end wall 37, an intermediate wall 41, and a second end wall 43. The side wall 34 is provided on one edge of the bottom floor 33 in a width direction W. The first end wall 37, the intermediate wall 41, and the second end wall 43 are provided on the other edge of the bottom floor 33 in the width direction W.

The side wall 34, the first end wall 37, the intermediate wall 41, and the second end wall 43 perpendicularly stand on the bottom floor 33, and the side wall 34 is provided with a predetermined gap in the width direction W from the first end wall 37, the intermediate wall 41, and the second end wall 43.

As illustrated in FIGS. 3A and 3B, the side wall 34 is provided over the entire region in the longitudinal direction L at the one edge of the first housing 30 in the width direction W.

In the side wall 34, an inner surface 35A facing the holding groove 31 is made flat whereas an outer surface 35B on the rear side of the inner surface 35A includes a broad locking groove 36 into which a part of the second housing 70 is inserted. The locking groove 36 is recessed toward the holding groove 31 side from the other outer surface 35B.

As illustrated in FIGS. 3A and 3B, the first end wall 37 is provided on one end of the first housing 30 in the longitudinal direction L.

The first end wall 37 includes electric wire holding holes 38 and 38 into which lead wires 56 and 56 drawn from the sensor intermediate body 50 are respectively inserted. The electric wire holding holes 38 and 38 penetrate through the first end wall 37 in the longitudinal direction L.

Further, the first end wall 37 includes a first coil holding surface 39 facing the side wall 34. The first coil holding surface 39 abuts on the coil element 10 housed in the holding groove 31, thereby holding, together with the side wall 34, the coil element 10 in the width direction W.

As illustrated in FIGS. 3A and 3B, the intermediate wall 41 is provided at a substantially center position of the first housing 30 in the longitudinal direction L, with a predetermined gap from the first end wall 37. The intermediate wall 41 includes a first sensor holding surface 42 facing the side wall 34. The first sensor holding surface 42 abuts on the sensor intermediate body 50 housed in the holding groove 31, thereby holding, together with the side wall 34, the sensor intermediate body 50 and the coil element 10 in the width direction W.

As illustrated in FIGS. 3A and 3B, the second end wall 43 is provided on the other end of the first housing 30 in the longitudinal direction L. The second end wall 43 is formed in an L-shape in a planar view, and includes a second sensor holding surface 44 and a second coil holding surface 45 both facing the side wall 34. The second sensor holding surface 44 abuts on the sensor intermediate body 50 housed in the holding groove 31, thereby holding, together with the side wall 34, the sensor intermediate body 50 in the width direction W. Further, the second coil holding surface 45 abuts on the sensor intermediate body 50 housed in the holding groove 31, thereby holding, together with the side wall 34, the sensor intermediate body 50 in the width direction W.

As illustrated in FIGS. 3A and 3B, a gap 47 is provided between the first end wall 37 and the intermediate wall 41, and is filled with the first locking part 73 that is a part of the second housing 70. In addition, a gap 48 is also provided between the second end wall 43 and the intermediate wall 41, and is filled with the second locking part 75 that is a part of the second housing 70. The view window 76, however, is provided in the second locking part 75 that fills the gap 48.

[Sensor Intermediate Body 50]

Figure 5A:
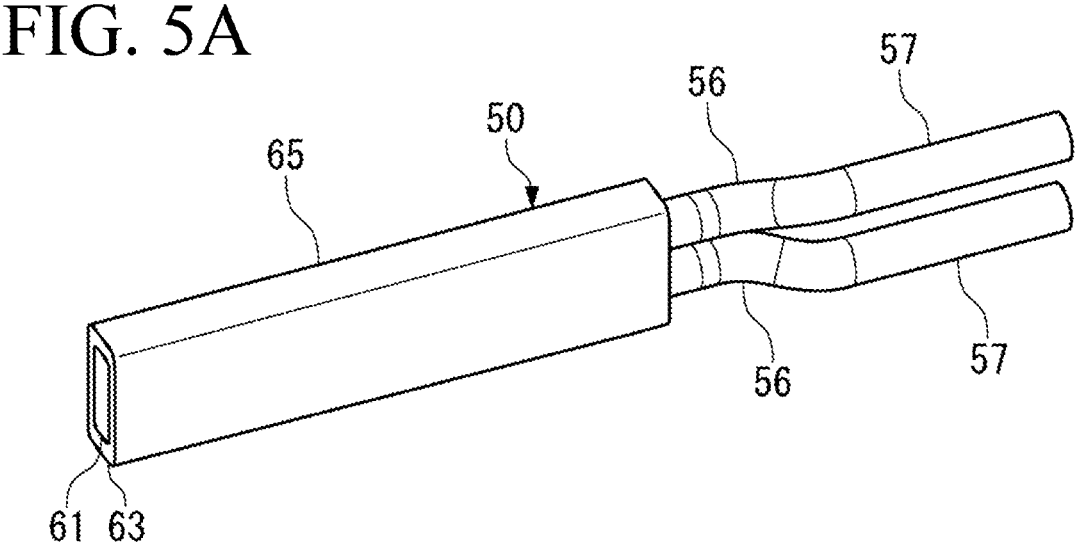
FIGS. 5A and 5B are perspective views illustrating the sensor intermediate body included in the temperature sensor of FIG. 1, FIG. 5A illustrating an outer shape thereof, and FIG. 5B illustrating an inside thereof in a transparent manner.
Figure 5B:
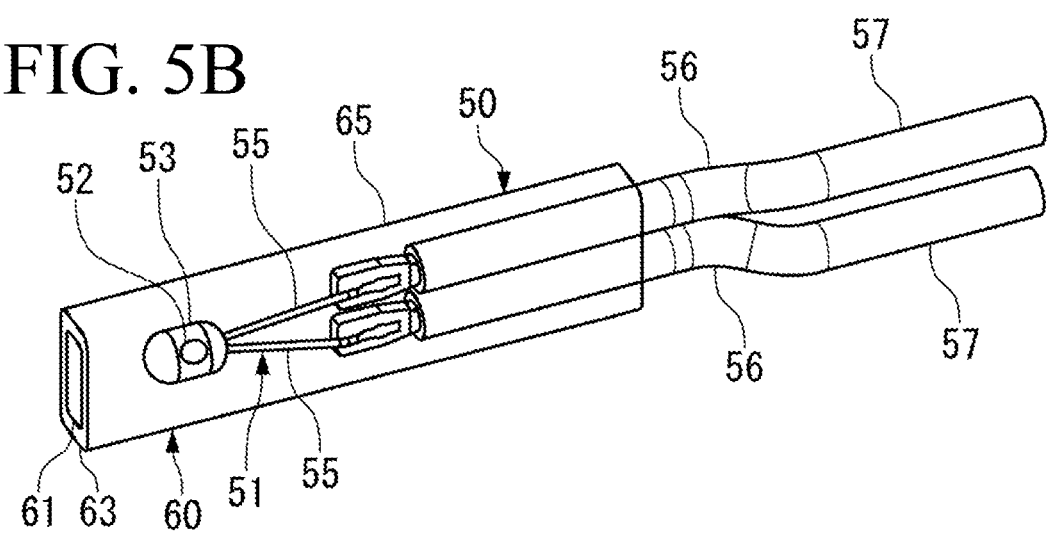

As illustrated in FIGS. 5A and 5B, the sensor intermediate body 50 includes an element main body 51, paired extraction wires 55 and 55, and the lead wires 56 and 56. The paired extraction wires 55 and 55 are electrically connected to the element main body 51. The lead wires 56 and 56 are respectively electrically connected to the extraction wires 55 and 55.

Note that, in a state where the sensor intermediate body 50 is held by the first housing 30, a side provided with the element main body 51 is defined as a forward side of the temperature sensor 1, and a side from which the lead wires 56 and 56 are drawn is defined as a rearward side.

The element main body 51 is a cylindrical member that includes the thermosensitive body 52 having temperature characteristics in electric resistance, and a sealing glass 53 covering surroundings of the thermosensitive body 52.

The thermosensitive body 52 includes, for example, a material having temperature characteristics in electric resistance, like a thermistor.

The sealing glass 53 is provided to seal and maintain the thermosensitive body 52 in an airtight state, thereby preventing chemical change and physical change based on an environmental condition from occurring on the thermosensitive body 52. Amorphous glass and crystalline glass are both usable as the sealing glass 53, or the amorphous glass and the crystalline glass are mixed so as to have a desired linear expansion coefficient and such a mixture may be used as the sealing glass 53.

The extraction wires 55 and 55 each include, for example, Dumet wire, and are electrically connected to the thermosensitive body 52 through an unillustrated electrode. The Dumet wire includes an inner layer and an outer layer provided around the inner layer. The inner layer contains an iron-nickel alloy having a linear expansion coefficient close to that of glass, and the outer layer is cladded with copper or a copper alloy having high electroconductivity.

In addition, each of the lead wires 56 and 56 respectively includes a twisted wire in which thin core wires are twisted, and an electrically insulating covering layers 57 and 57 covering the twisted wire. The lead wires 56 and 56 are connected to an unillustrated temperature measurement circuit through other electric wires as necessary. Note that the covering layers 57 and 57 each contain a fluorine resin such as polytetrafluoroethylene (PTFE) and a tetrafluoroethylene-perfluoroalkylvinylether copolymer (PFA).

In addition, as illustrated in FIGS. 5A and 5B, in the sensor intermediate body 50, the whole of the element main body 51 and the extraction wires 55 and 55 and a part of the lead wires 56 and 56 are covered with the electrically insulating covering body 60, and the element main body 51 is protected from the surrounding environment.

The covering body 60 includes a substantially rectangular parallelepiped shape, and includes an inner layer 61 and an outer layer 63.

The inner layer 61 is disposed inside the outer layer 63, and directly covers the element main body 51. The inner layer 61 air-tightly seals a portion from a front end of the element main body 51 to the middle of the lead wires 56 and 56.

The inner layer 61 is formed of a fluorine resin containing a tetrafluoroethylene-perfluoroalkylvinylether copolymer (PFA). The PTFE and the PFA are fluorine resins and have excellent resistance in common; however, the PTFE has a melting point higher than that of the PFA. In addition, the PTFE and the PFA both include transparency, and in particular, the PFA include high transparency.

Further, the outer layer 63 is provided in close contact with outside of the inner layer 61.

The outer layer 63 provides, together with the inner layer 61, resistance to the element main body 51, and holds the inner layer 61 that is melted in a manufacturing process. Accordingly, the outer layer 63 contains the PTFE that has a melting point higher than that of the PFA forming the inner layer 61.

The outer layer 63 includes the flat detection surface 65, and the detection surface 65 comes into contact with the flat detection surface 12 of the coil element 10. As a result, the covering body 60 and the coil element 10 come into surface contact with each other.

The covering body 60 is fabricated by preparing an inner layer tube corresponding to the inner layer 61 and an outer layer tube corresponding to the outer layer 63, inserting the element main body 51 into the inner layer tube and disposing the outer layer tube on the outside of the inner layer tube, and performing heating and pressurization.

The melting point of the PFA configuring the inner layer tube is 302° C. to 310° C. whereas the melting point of the PTFE configuring the outer layer tube is 327° C. Therefore, if both are heated to, for example, 315° C., the inner layer tube is melted but the outer layer tube is not melted and can maintain its shape. The outer layer tube, however, contracts when heated to this temperature. The PTFE includes a linear expansion coefficient of about $10 \times 10^{-5}/°$ C., and strongly compresses the inner layer tube in the melted state. This contributes to densification of the inner layer 61, and air-tightness between the inner layer 61 and the outer layer 63 is secured by pressure generated therebetween.

Press working is performed with use of a mold having a rectangular parallelepiped cavity while the inner layer tube is melted, which results in the rectangular parallelepiped covering body 60.

In the present embodiment, a transparent fluorine resin is used as the covering body 60. This allows for visual confirmation of soundness of the element main body 51 buried inside the covering body 60 through the view window 76. In addition, the fluorine resin is rich in elasticity as compared with other resin materials. Accordingly, even if the coil element 10 as a temperature detection object vibrates, the covering body 60 follows the vibration and is tightly pressed against the coil element 10.

[Second Housing 70]

As illustrated in FIG. 1 and FIG. 2, the second housing 70 covers and hides the coil element 10 and the sensor intermediate body 50 that are housed in the first housing 30, from a thickness direction T, and holds, together with the first housing 30, the coil element 10 and the sensor intermediate body 50.

The second housing 70 includes a base part 71 that covers and hides the holding groove 31. In addition, the second housing 70 includes the first locking part 73, the second locking part 75, and the third locking part 77. The first locking part 73 communicates with the base part 71 and fills the gap 47 between the first end wall 37 and the intermediate wall 41. The second locking part 75 communicates with the base part 71 and fills the gap 48 between the second end wall 43 and the intermediate wall 41. The third locking part 77 fills the locking groove 36 of the side wall 34.

As illustrated in FIG. 2, the base part 71, the first locking part 73, the second locking part 75, and the third locking part 77 that are integrally formed are provided over four surfaces of the first housing 30. Therefore, the second housing 70 is firmly fixed to the first housing 30 so as not to be displaced in position from each other.

The second housing 70 includes the view window 76 in the second locking part 75. The view window 76 penetrates front and rear surfaces of the second locking part 75, and is provided corresponding to a position at which the thermosensitive body 52 housed in the holding groove 31 is disposed. The element main body 51 is covered with the covering body 60. The covering body 60, however, has transparency, and accordingly, the thermosensitive body 52 and the sealing glass 53 are visually confirmable through the view window 76.

[Manufacturing Procedure]

Next, a procedure of manufacturing the temperature sensor 1 is described with reference to FIG. 4 and FIG. 5.

First, as illustrated in FIGS. 3A and 3B, the sensor intermediate body 50 is housed in the holding groove 31 of the first housing 30 disposed such that the holding groove opens upward. The sensor intermediate body 50 is housed in the holding groove 31 such that the lead wires 56 and 56 are respectively inserted into the electric wire holding holes 38 and 38 of the first end wall 37.

Figure 4A:
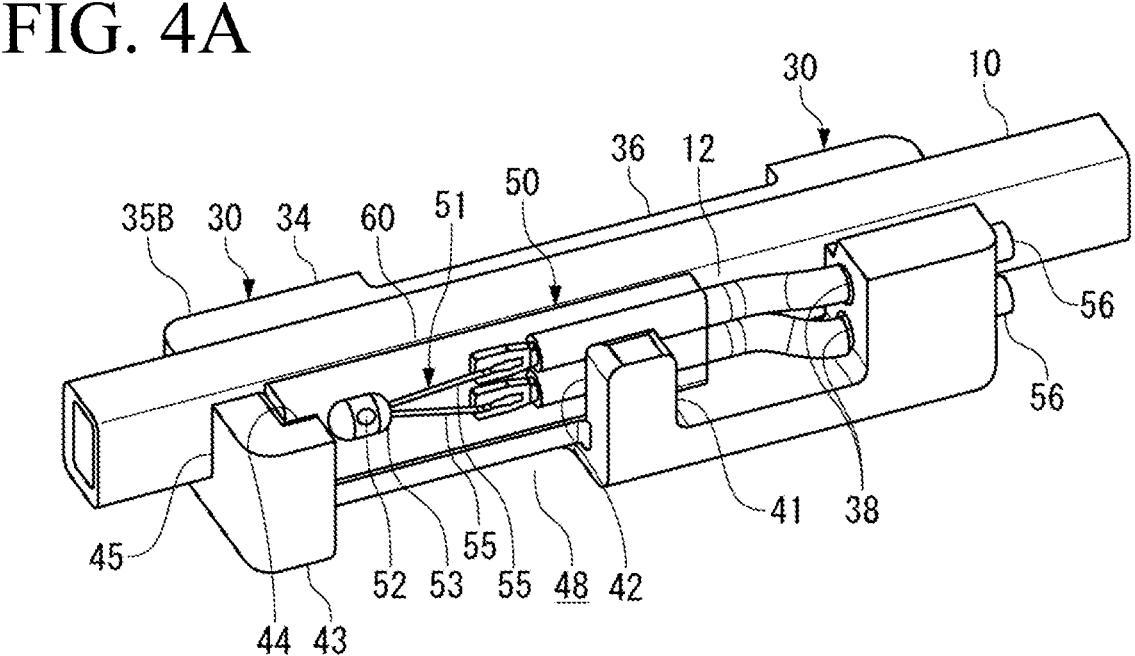
FIGS. 4A and 4B illustrate the procedure following FIG. 3, FIG. 4A illustrating a state where a coil element is disposed in the first housing, and FIG. 4B illustrating a state where a second housing is formed by resin molding on the first housing.
Figure 4B:
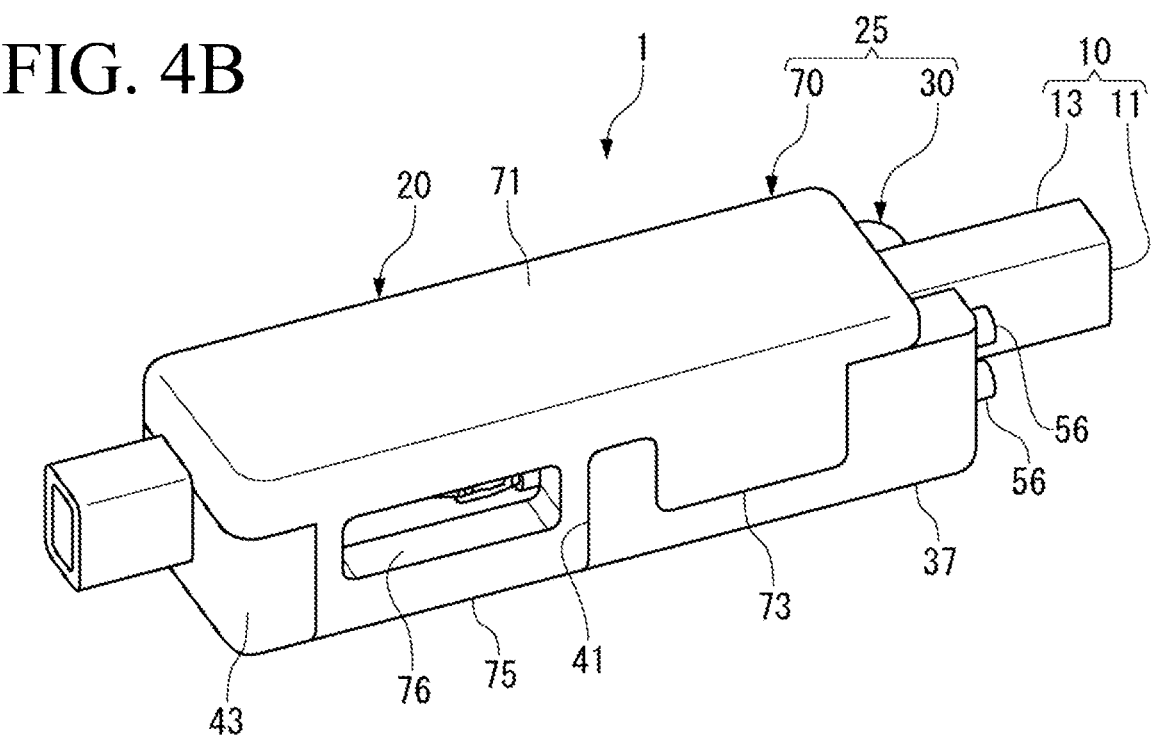
Figure 4B:
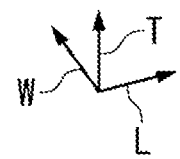

Note that, in the sensor intermediate body 50 illustrated in FIG. 4 and FIG. 5, a side provided with the first end wall 37, the intermediate wall 41, and the second end wall 43 is referred to as a front side, and a side provided with the side wall 34 is referred to as an inner side.

As illustrated in FIG. 3A, the sensor intermediate body 50 is housed at a predetermined position of the first housing 30 when the sensor intermediate body 50 is housed on the front side of the holding groove 31, the lead wires 56 and 56 are respectively inserted into the electric wire holding holes 38 and 38, and the covering body 60 comes into contact with the first sensor holding surface 42 of the intermediate wall 41 and the second sensor holding surface 44 of the second end wall 43. The holding groove 31 on the inner side includes, between the sensor intermediate body 50 and the side wall 34, a space to house the coil element 10.

After the sensor intermediate body 50 is housed at the predetermined position of the first housing 30, the coil element 10 is housed in the space of the holding groove 31 as illustrated in FIG. 4A. Dimensions of each of the holding groove 31 of the first housing 30, the covering body 60 of the sensor intermediate body 50, and the coil element 10 are set to house the coil element 10 in the space without a gap. Assuming that the temperature sensor 1 is used in an environment in which vibration is applied to the temperature sensor 1, a slight interference is preferably provided between the space and the coil element 10, and fitting the coil element 10 into the space preferably causes the coil element 10 and the sensor intermediate body 50 to press against each other.

The coil element 10 has the dimension in the longitudinal direction L larger than the dimension of the first housing 30, and is housed in the holding groove 31 such that both ends of the coil element 10 project from the first housing 30.

The coil element 10 comes into contact with the side wall 34 on the inner side. In addition, on the front side, the surface as the temperature detection object of the coil element 10 comes into contact with the covering body 60 of the sensor intermediate body 50 as well as the first coil holding surface 39 of the first end wall 37 and the second coil holding surface 45 of the second end wall 43. As a result, the coil element 10 is housed at the predetermined position of the first housing 30.

After the coil element 10 is housed in addition to the sensor intermediate body 50, the second housing 70 is formed through injection molding as illustrated in FIG. 4B. In molding of the second housing 70 by a resin mold, the thermosensitive body 52 and the sealing glass 53 receives considerable pressure, which may cause breakage of the thermosensitive body 52.

The second housing 70 is formed such that the holding groove 31 of the first housing 30 is sealed from the outside, and the coil element 10 and the sensor intermediate body 50 housed in the holding groove 31 are covered with and hidden by the second housing 70. This prevents the thermosensitive body 52 from being thermally influenced by any part other than the coil element 10, and strengthens the fixing of the coil element 10 and the sensor intermediate body 50.

The second housing 70 is formed to include the view window 76 in the second locking part 75. The view window 76 penetrates the front and rear surfaces of the second locking part 75, which allows for visual confirmation of the covering body 60 of the sensor intermediate body 50 from the outside. The view window 76 is provided at a position corresponding to the thermosensitive body 52 of the sensor intermediate body 50.

[Effects]

Effects achieved by the temperature sensor 1 are described below.

According to the temperature sensor 1, the view window 76 is provided at the position corresponding to the sensor intermediate body 50 of the thermosensitive body 52. This allows for visual confirmation of soundness of the thermosensitive body 52 and the sealing glass 53 from the outside even after the second housing 70 is formed. Therefore, according to the temperature sensor 1, it is possible to detect a defective thermosensitive body 52 after the second housing 70 is formed and to eliminate the temperature sensor 1.

In addition, the element main body 51 including the thermosensitive body 52 is covered with the transparent covering body 60 in the temperature sensor 1, which allows for visual confirmation of the soundness of the thermosensitive body 52 while protecting the element main body 51.

In addition, since the flat detection surface 65 of the covering body 60 and the flat detection surface 12 of the coil element 10 come into surface contact with each other in the temperature sensor 1, sensitivity with respect to temperature variation of the coil element 10 is enhanced, which contributes to accuracy improvement of the detection temperature.

In particular, the covering body 60 including the fluorine resin is rich in elasticity among resin materials. Therefore, even if the coil element 10 as the temperature detection object vibrates, the covering body 60 follows the vibration and is tightly pressed against the coil element 10. This contributes to accuracy improvement of the detection temperature.

In addition, since the covering body 60 is rich in elasticity, it is advantageous to provide the view window 76 in the second housing 70. In other words, to form the view window 76 through injection molding, a part of the mold is disposed at the positions respectively corresponding to the view window 76, and the part of the mold comes into contact with the covering body 60 housed in the holding groove 31.

If contact force of the mold and the covering body 60 is weak, the melted resin configuring the second housing 70 enters between the mold and the covering body 60 and covers the view window 76, which inhibits visual confirmation of the thermosensitive body 52.

Even if the contact force of the mold and the covering body 60 is strong, the covering body 60 according to the present embodiment is not broken because the covering body 60 is rich in elasticity. For example, if the covering body 60 contains a resin material similar to that of the second housing 70, the covering body 60 may be broken when the contact force of the mold and the covering body 60 is increased. Therefore, it is necessary to strictly adjust the contact force of the mold and the covering body 60.

According to the present embodiment, such adjustment is unnecessary because the covering body 60 is rich in elasticity. This facilitates manufacturing of the temperature sensor 1.

In addition, in the temperature sensor 1, the lead wires 56 and 56 of the element main body 51 are respectively inserted into the electric wire holding holes 38 and 38 of the first housing 30 and are held by the first end wall 37. The lead wires 56 and 56 are held by the first end wall 37 at a time when the element main body 51 is housed in the first housing 30. Accordingly, the positions of the lead wires 56 and 56 are maintained even when the injection molding to form the second housing 70 is performed thereafter. Therefore, the melted resin does not damage the lead wires 56 and 56 even if touching, and the lead wires 56 and 56 may be drawn from the first housing 30.

The preferred embodiment of the present invention has been described above. Other than the above, the configurations described in the above-described embodiment may be selected or appropriately modified without departing from the scope of the present invention. For example, the temperature sensor 1 includes only one view window 76 in the second locking part 75; however, the present invention is not limited thereto. For example, a view window similar to the view window 76 may be provided in the third locking part 77 that is a rear surface with respect to the view window 76.

In addition, in the present embodiment, the example in which the view window 76 is provided in the second housing 70 including the resin molded body has been described; however, the present invention is not limited thereto. The view window may be provided on the first housing 30 that is previously prepared as an injection molded product, or may be provided in both of the first housing 30 and the second housing 70.

In this case, the view window 76 is formed at a time when the first housing 30 is formed through injection molding.

Further, in the present embodiment, the example in which the most part of the element main body 51 including the thermosensitive body 52 is covered with the covering body 60 including the fluorine resin has been described. The covering body 60, however, is optional in the present invention, and the covering body 60 may include other transparent resin material, or may not be provided.

REFERENCE SIGNS LIST

1 Temperature sensor
10 Coil element
11 Conductor
12 Detection surface
13 Covering
20 Sensor assembly
25 Housing
30 First housing
31 Holding groove
33 Bottom floor
34 Side wall
35A Inner surface
35B Outer surface
36 Locking groove
37 First end wall
38 Electric wire holding hole
39 First coil holding surface
41 Intermediate wall
42 First sensor holding surface
43 Second end wall
44 Second sensor holding surface
45 Second coil holding surface
47, 48 Gap
50 Sensor intermediate body
51 Element main body
52 Thermosensitive body
53 Sealing glass
55 Extraction wire
56 Lead wire
57 Covering layer
60 Covering body
61 Inner layer
63 Outer layer
65 Detection surface
70 Second housing
71 Base part
73 First locking part
75 Second locking part
76 View window
77 Third locking part
L Longitudinal direction
W Width direction
T Thickness direction

The invention claimed is:

1. A temperature sensor, comprising:
    a coil element serving as a part of a coil of an electric apparatus, and extending along a longitudinal axis;
    an element main body that includes a thermosensitive body detecting heat of the coil element, and paired electric wires connected to the thermosensitive body; and
    a housing that includes an electric insulating resin material, and is configured to house and hold the coil element and the element main body, wherein
    the housing includes, at a position corresponding to the thermosensitive body, a view window allowing for visual confirmation of the thermosensitive body from outside, and wherein the view window is a cutout formed in a wall of the housing and extends parallel to the coil element with respect to the longitudinal axis.

2. The temperature sensor according to claim 1, wherein the housing includes a first housing and a second housing both configuring the housing, and the view window is provided on one or both of the first housing and the second housing.

3. The temperature sensor according to claim 2, wherein the second housing includes a resin molded body with respect to the first housing, and the view window is provided in the second housing.

4. The temperature sensor according to claim 2, wherein the temperature sensor further includes paired lead wires which are respectively electrically connected to the electric wires of the element main body, the first housing includes electric wire holding holes into which the paired lead wires are respectively inserted, and the paired lead wires are drawn to the outside through the electric wire holding holes.

5. The temperature sensor according to claim 1, further comprising a covering body that includes a resin and closely covers the entire thermosensitive body and a part of the electric wires, wherein the view window is provided at a position corresponding to the thermosensitive body covered with the covering body.

6. The temperature sensor according to claim 5, wherein the covering body comes into surface contact with the coil element.

7. The temperature sensor according to claim 5, wherein the covering body includes a resin material having elasticity higher than elasticity of the resin material configuring the housing, and the housing includes the resin material having rigidity higher than rigidity of the resin configuring the covering body.

8. The temperature sensor according to claim 7, wherein the covering body includes a fluorine resin.

9. The temperature sensor according to claim 5, wherein the resin is transparent.

10. The temperature sensor according to claim 5, wherein the covering body includes an inner layer and an outer layer.

* * * * *